Figure 1:
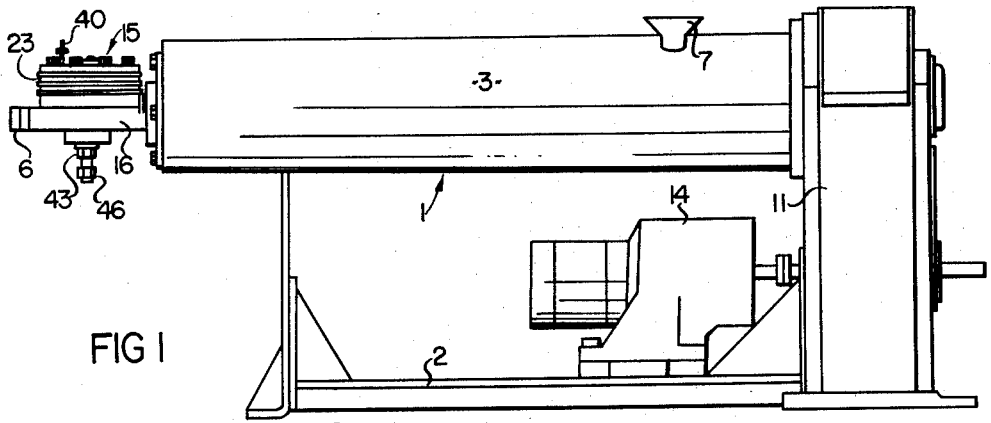

Sept. 1, 1964       L. B. SPONAUGLE       3,146,494
EXTRUDER WITH REVERSE FLOW FLUSHED BREAKER PLATE ASSEMBLY
Filed Nov. 13, 1961

INVENTOR.
L. BLAIR SPONAUGLE
BY Oberlin, Maky & Donnelly
ATTORNEYS

# United States Patent Office 3,146,494
Patented Sept. 1, 1964

3,146,494
EXTRUDER WITH REVERSE FLOW FLUSHED
BREAKER PLATE ASSEMBLY
Lloyd Blair Sponaugle, Akron, Ohio, assignor to National Rubber Machinery Company, Akron, Ohio, a corporation of Ohio
Filed Nov. 13, 1961, Ser. No. 151,864
5 Claims. (Cl. 18—12)

The present invention relates generally as indicated to an extruder and more particularly to a screw type extruder having a breaker plate and screen pack assembly between the discharge end of the feed screw and the forming die.

As known in the art, breaker plate assemblies with screen packs are conventional in extruders for filtering from the mass of plastic material worked upon by the feed screw, any foreign matter and other contaminants such as lumps of unmelted material, or clot-like agglomerations of material. Such breaker plate assemblies also are employed to develop back pressure in the extruder cylinder for effective working and plasticization of the material by the feed screw, to control the flow of material through the extrusion die, to reduce surging of the material, and to assist in mixing of the material for the production of a homogeneous extruded product.

In most cases, the breaker plate assembly is mounted directly on the end of the extruder barrel or cylinder and is clamped in place by the forming die. As evident, in that arrangement the extruding operation must be stopped when it becomes necessary to replace or to clean the breaker plate assembly and, when the extruder is again set in operation, it may take considerable time for the extruder to reach its proper operating condition whereat the temperatures, pressures, and flows are balanced to produce the desired quality of extruded product.

As early as 1900 (see Cowen Pat. No. 642,813) it has been proposed to provide slide plates having two sets of breaker plate holes and screen packs, whereby the plugged set may be replaced by a clean set simply by sliding the plate transversely across the end of the extruder. From time to time improvements have been made in the sealing of slide plates and in the provision of rotary plates for changing from one breaker plate and screen pack assembly to another, as evidenced in the recent patents to Birmingham 2,661,497, McIntosh 2,771,-636 and Samler 2,763,308, 2,786,504 and 2,838,084. Despite the fact that in the aforesaid patented extruders a plugged breaker plate may be quickly replaced by a clean one there is, nevertheless, a sudden obstruction to the flow of plastic material which affects the extruded product and, moreover, it is quite expensive to replace or to clean the plugged breaker plate and screen pack assembly. Furthermore the incoming breaker plate introduces air into the stream of plastic material and this air causes a spoilage of the extruded plastic material for a period of time.

Accordingly, it is a principal object of this invention to provide an extruder in which the breaker plate and screen pack assembly is kept clear without need of frequent replacement or cleaning as is characteristic of known structures as aforesaid.

It is another object of this invention to provide an extruder in which the breaker plate and screen pack assembly has provision for reverse flow of the plastic material therethrough for flushing and dislodging of the foreign matter and contaminants on the upstream side of said assembly.

It is yet another object of this invention to provide an extruder in which the breaker plate and screen pack assembly is periodically flushed clear by reverse flow of the plastic material therethrough, the reverse flow being progressive and of such small magnitude at any given moment as not to affect the balance of the pressures, temperatures, and flows of the material in the extruder and in the forming die.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
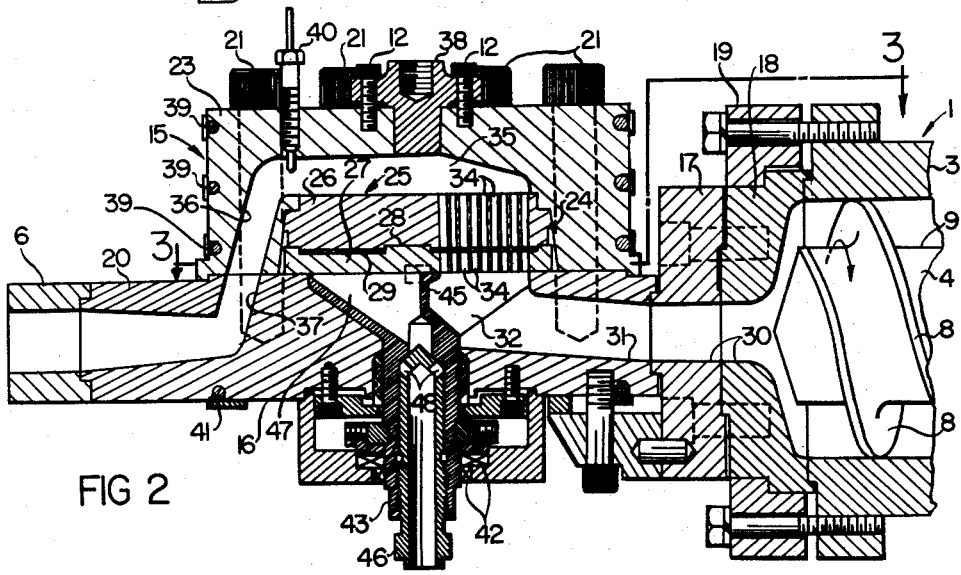
Figure 3:
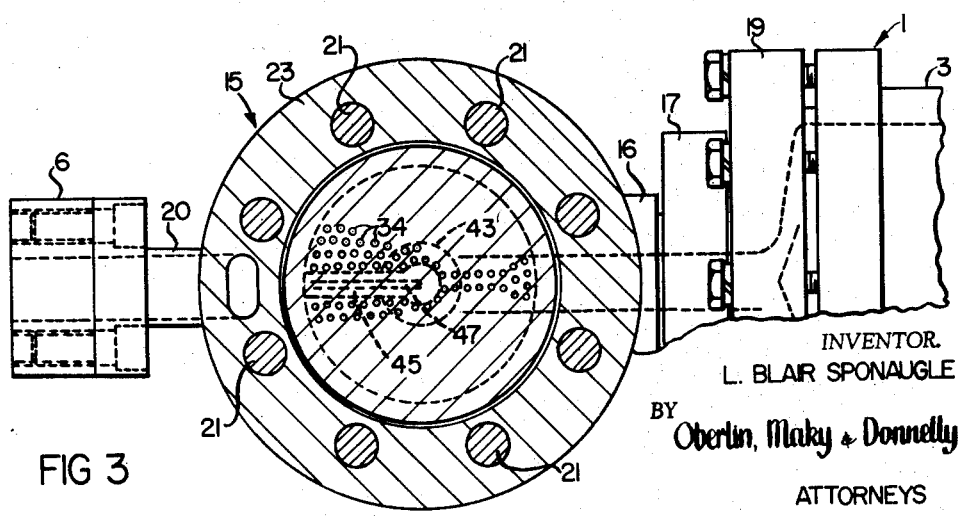

In said annexed drawings:
FIG. 1 is a side elevation view of an extruder embodying the present invention;
FIG. 2 is a central vertical cross-section view showing a portion of the discharge end of the extruder barrel, the breaker plate and screen pack assembly, and the forming die; and
FIG. 3 is a horizontal cross-section view taken substantially along the line 3—3, FIG. 2.

Referring now more particularly to the drawings, the extruder 1 herein comprises a base or support frame 2 which supports the extruder barrel or cylinder 3 in which the feed screw 4 is rotated. In any event, when material is introduced into the cylinder 3 through the feed opening 7, the rotation of the feed screw 4 in the direction indicated by the arrow in FIG. 2 will cause the material to be advanced toward the die 6 by the helical flights 8 on the hub 9 of the feed screw 4.

The reference numeral 11 denotes the drive head of the extruder 1 which is provided with the usual drive quill for the feed screw and gear drive operatively associated with the drive motor 14 mounted on the base 2.

Insofar as the breaker plate and screen pack assembly 15 is concerned, it comprises a generally cylindrical body 16 which, at one end, has plates 17 and 18 bolted together with the plate 17 in turn bolted to the body 16 and with the other plate 18 bolted on the end of the cylinder 3 as by ring 19. The opposite end of the body 16 is formed with an outlet port 20 to which the extrusion die 6 is bolted as shown.

Secured on the top side of the body 16 as by the screws 21, is a breaker plate housing 23 having a circular tapered recess 24 in which the breaker plate assembly 25 is clamped, said assembly herein being shown as comprising two perforate plates 26 and 27 which are keyed together by the inter-fitting oblong complemental boss and recess 28 and between which is clamped the screen pack 29.

The plates 17 and 18 define a passageway 30 which registers with the passage 31 of the body 16 and, in turn, the body passage 31 leads to a frusto-conical recess 32 in the top face, the base of the recess 32 being of diameter to span all of the circular series of holes or apertures 34 formed in the breaker plates 26 and 27, whereby material flowing through the passages 30 and 31 into the frust-conical recess 32 flows uniformly through the breaker plate apertures 34 and through the screen pack 29 into the circular chamber 35 defined between the housing 23 and the upper breaker plate 26, and from that chamber 35 the filtered plastic material flows through the registering oblong passages 36 and 37 in the housing 23 and in the body 16 to the extrusion orifice of the die 6.

The top of the housing 23 has a central plug 38 which may be removed for driving out the breaker plate assembly or for assisting in the flushing out of the contents of the extruder as when changing from one color material to another color, or when changing from one material to a different material. Screws 12 are provided to hold plug 38 in place. Several electric heaters 39 may be disposed in grooves of the housing 23 to maintain the same at proper temperature, and a thermocouple 40 or the like may be positioned in the chamber 35 to sense the material temperature so that the heating elements 39 may be regulated in known manner. The body 16 also has a groove for an electric heating element 41, whereby the plastic material discharged from the extruder barrel 3 is maintained at desired temperature during the course of its flow to the extrusion orifice of die 6.

Journalled in the body 16 by axial and radial thrust bearings 42, is a valve assembly or sweeper stem 43 which has a radially extending shoe or foot 45 in sliding sealed engagement with the bottom plane face of the breaker plate 27. Normally, the sweeper stem 43 and shoe or foot 45 will be in the position shown in FIGS. 2 and 3 in an area of the breaker plate 27 which does not contain any apertures 34, whereby the plastic material will flow uniformly through all the numerous breaker plate apertures 34 which number two hundred and forty-one in this embodiment from the frusto-conical chamber 32 into the circular chamber 35 on the downstream side of the breaker plate 26, whereby foreign matter, unmelted particles of plastic material, or clot or jell-like agglomerations of such material, will be strained out by the screen pack 29. When the breaker plate assembly 25 becomes blocked or plugged to a certain extent by accumlation of contaminants, as would be evidenced by increase in back pressure upstream of the breaker plate assembly 25, the valve member 46 in the sweeper stem 43 will be opened by partially unscrewing the same, whereupon the long narrow slot 47 in the shoe 45 of the sweeper stem will be communicated with the atmosphere via the passages 48 leading to the interior of the tubular valve member 46. At that time, the sweeper stem 43 will be slowly rotated to progressively bring the radial slot 47 thereof into register with the breaker plate apertures 34. Because of the pressure differential in the chamber 35 on the downstream side of the breaker plate assembly 25 as compared with that in the radial slot 47, a portion of the material being under pressure, will flow in the opposite direction through those apertures 34 which at that time are in register with the radial slot 47 thereby flushing those apertures and dislodging particles therefrom through the sweeper stem and the valve 46. The shoe or foot 45 of the sweeper stem 43 is relatively narrow in width, whereby, at any given time, during the rotation of the sweeper stem 43, less than about 4% of the apertures 34 are being flushed and, therefore, the back pressure in cylinder 3 and the extruding pressure are not caused to vary appreciably during the flushing operation. In any event, no changes in pressures, flows, or temperatures, need be made in the extruder 1 during the flushing operation. When the flushing operation has been completed as by one relatively slow revolution of the sweeper stem 43, it is brought to rest at the FIG. 3 position whereby the plastic flow through the assembly continues in normal manner through the cleaned breaker plate assembly 25.

It is to be understood that the sweeper stem 43 may be automatically rotated by suitable power drive means which is energized as by the reaching of a predetermined maximum back pressure in the extruder 1 upstream of the breaker plate assembly 25. Thus, a pressure responsive element may actuate a switch or valve to control energization of an electric motor or fluid motor coupled to the sweeper stem 43 and also to the valve 46 to open the latter and to turn the sweeper stem 43 one or more complete revolutions as required to decrease the back pressure to the desired value. As evident, the increased back pressure upstream of the breaker plate assembly 25 is an indication of plugging. Such movement of the sweeper stem 43 may also be controlled by a pressure responsive unit on the downstream side of the breaker plate assembly 25 and in that event, the lower the pressure or flow through the chamber 35, the more plugged is the breaker plate assembly and thus a reduction in pressure in the chamber 35 below a predetermined value will then energize the motor for the sweeper stem 43.

In view of the foregoing, it can be seen that the present invention makes provision for continuous, uninterrupted operation of an extruder 1 without having to dismantle the extruder to replace the breaker plate assembly 25, or without frequently removing the breaker plate assembly 25 for replacement or cleaning. With the present invention the breaker plate assembly 25 is kept clean simply by periodic reverse flow flushing of a few apertures 34 at a time. Normally the amount of material necessary to flush the breaker plate is small however, if the material is of a type which is reworkable, or reusable, it may be strained after it emerges from the valve 46 and repulverized for recirculation through the extruder 1.

Whereas, the breaker plate assembly 15 herein is of the plate type, and the valve assembly 43 cooperates with the upstream plane perforated face of said assembly 15, it is to be understood that the breaker plate assembly may be of the basket or tubular type wherein the material is filtered by flow radially through the perforated wall of the basket, and the valve assembly is either in the form of a ring having a vented groove registering with a few of the perforations at a time on the upstream wall of basket as the ring is moved axially or in the form of an axially extending blade having a vented axial groove similarly registering with a few of the perforations at a time when the blade is rotated about the axis of the basket in contact with the upstream wall of the basket.

Other modes of applying the principle of the invention may be employed, change being made as regards the details described, provided the features stated in any of the following claims, or the equivalent of such, be employed.

I therefore particularly point out and distinctly claim as my invention:

1. In an extruder of the type having a feed opening adjacent one end, and a rotatable feed screw therein for advancing material therearound from said feed opening toward a forming die at the other end, the combination therewith of a breaker plate assembly in advance of said die having numerous apertures therethrough arranged in a plurality of concentric circles for filtering the material during the course of its flow toward said die; and a valve member upstream of said assembly having a relatively narrow radial foot with a radially extending vented passage which registers with just a few apertures at a time as said foot is rotated about the axis of such circles of apertures.

2. A breaker plate assembly for insertion in the material flow path of an extruder, said assembly comprising a perforate filter plate having perforations therethrough arranged in concentric circles; and a valve member upstream of said plate having a relatively narrow radial foot containing a vented passage which registers with just a few of such perforations at a time for reverse flow of material for dislodging contaminants filtered thereby as said foot is rotated about the axis of such circles.

3. An extruder comprising a cylinder having an inlet for introduction of plastic and like material; a feed screw rotatable in said cylinder having a helical flight effective, upon rotation of said feed screw, to advance material through said cylinder; a breaker plate assembly having an inlet to receive material from said cylinder, a perforate filter plate for flow of material therethrough, and a main unobstructed outlet for filtered material; said assembly also having a valve controlled secondary outlet for reverse flow of filtered material through selected portions of said plate for dislodging contaminants therefrom; said secondary outlet at any given time registering with but a minor portion of the area of said plate whereby extrusion of material from said main outlet may be continued during reverse flow flushing of the selected minor portion; and said valve-controlled secondary outlet being movable to subject different minor portions of said plate to such flushing without interruption of the extrusion of material from said main outlet.

4. The extruder of claim 3 wherein said filter plate is disposed for flow of material upwardly through the apertures thereof, and wherein said secondary outlet extends downwardly for downward flow of material through selected portions of said plate for dislodging contaminants therefrom.

5. The extruder of claim 3 wherein said valve-controlled secondary outlet is movable to an inactive position closing said secondary outlet.

References Cited in the file of this patent

UNITED STATES PATENTS

| | | |
|---|---|---|
| 1,945,839 | Von Maltitz | Feb. 6, 1934 |
| 2,184,177 | Burrell | Dec. 19, 1939 |
| 2,310,587 | MacNeill | Feb. 9, 1943 |
| 2,362,750 | Hayward | Nov. 14, 1944 |
| 2,728,943 | Hertz et al. | Jan. 3, 1956 |
| 2,771,636 | McIntosh et al. | Nov. 27, 1956 |
| 2,999,597 | Harms | Sept. 12, 1961 |